United States Patent
Restrepo et al.

(10) Patent No.: US 7,492,163 B2
(45) Date of Patent: Feb. 17, 2009

(54) SYSTEMS, DEVICES, AND METHODS FOR ARC FAULT DETECTION

(75) Inventors: Carlos Restrepo, Atlanta, GA (US); Peter Spenlove Staley, Kings Park, NY (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/380,535

(22) Filed: Apr. 27, 2006

(65) Prior Publication Data

US 2007/0252603 A1     Nov. 1, 2007

(51) Int. Cl.
*G01R 31/08*     (2006.01)
*H02H 3/00*     (2006.01)

(52) U.S. Cl. .................. 324/536; 361/42; 324/424; 324/76.16

(58) Field of Classification Search .............. 324/536, 324/76.16
See application file for complete search history.

(56) References Cited

U.S. PATENT DOCUMENTS

| | | | |
|---|---|---|---|
| 5,729,145 A | 3/1998 | Blades | |
| 5,835,321 A * | 11/1998 | Elms et al. | 361/45 |
| 5,839,092 A | 11/1998 | Erger | |
| 6,031,699 A | 2/2000 | Dollar, II | |
| 6,259,996 B1 | 7/2001 | Haun | |
| 6,362,628 B2 * | 3/2002 | Macbeth et al. | 324/536 |
| 6,417,671 B1 | 7/2002 | Tiemann | |
| 6,459,273 B1 | 10/2002 | Dollar, II | |
| 6,504,692 B1 | 1/2003 | Macbeth | |
| 6,556,397 B2 | 4/2003 | Kim | |
| 6,567,250 B1 | 5/2003 | Haun | |
| 6,590,754 B1 * | 7/2003 | Macbeth | 361/42 |
| 6,744,260 B2 * | 6/2004 | Schmalz et al. | 324/555 |
| 6,943,558 B2 * | 9/2005 | Hale et al. | 324/536 |
| 2003/0074148 A1 * | 4/2003 | Dvorak et al. | 702/58 |
| 2005/0286185 A1 | 12/2005 | Henson | |
| 2006/0227469 A1 * | 10/2006 | Parker et al. | 361/5 |

* cited by examiner

*Primary Examiner*—Vincent Q Nguyen
*Assistant Examiner*—John Zhu

(57) ABSTRACT

Certain exemplary embodiments can include an arc fault detection circuit. The arc fault detection circuit can include a zero crossing analysis sub-system including a counter configured to determine, for a first waveform, a count of dips that occur between a pair of predetermined zero crossings of a second waveform. The second waveform can be obtained from an electrical circuit.

19 Claims, 16 Drawing Sheets

Ⓑ SLICE MASK REGION
REMOVE DC OFFSET FROM RSSI
OUTPUT = RSSI − ZERO CROSSING MIN
             (RECORDED OUT PREVIOUSLY)
DC RESTORE
OUTPUT

DC OFFSET REMOVED TO SIGNALS
THAT RELATE PERIODICALLY TO 60 Hz
(ARC FAULTS & BPL MEET THIS CRITERIA)

US 7,492,163 B2

SYSTEMS, DEVICES, AND METHODS FOR ARC FAULT DETECTION

BACKGROUND

U.S. Pat. No. 5,729,145 (Blades), which is incorporated by reference herein in its entirety, allegedly recites that "[a]rcing in an AC power system is detected by monitoring the power waveform for wideband high-frequency noise, and examining the detected noise for patterns of variation in its amplitude synchronized to the power waveform. A narrowband, swept-frequency detector and synchronous averaging may be employed to improve discrimination of arc noise from background interference. An arcing fault interrupter for controlling a single circuit, and a whole house monitor, for detecting arcing anywhere in a house, are described." See Abstract.

U.S. Pat. No. 6,556,397 (Kim), which is incorporated by reference herein in its entirety, allegedly recites a "device for detecting arc fault which distinguishes harmful arc from the signal generated by operation of a dimmer and start of electronic devices. Signals outputted from a current transformer is attenuated by a resistor which is coupled in parallel to the current transformer. By the attenuation of the resistor, the signal generated by the operation of a dimmer is not determined to be arc in arc determining part. Harmful arc and the signal generated by the start of the electronic device are distinguished by integrating both signals. As the harmful arc lasts for a long time, large signals are integrated in an integrator while the signal generated by the start of electronic device does not last for a long time." See Abstract.

U.S. Pat. No. 6,567,250 (Haun), which is incorporated by reference herein in its entirety, allegedly recites an "arcing fault protection assembly in an electrical device, and corresponding methods determine whether arcing is present in the device. The assembly comprises a sensor, a broadband noise circuit, and a controller. The sensor detects a current and develops a corresponding sensor signal. The broadband noise circuit determines the presence of broadband noise in the sensor signal and produces a corresponding output signal. The controller processes the sensor signal and the output signal in a predetermined fashion to determine whether an arcing fault is present. The sensor, broadband noise circuit, and controller are mounted to the device." See Abstract.

SUMMARY

Certain exemplary embodiments can comprise an arc fault detection circuit. The arc fault detection circuit can comprise a zero crossing analysis sub-system comprising a counter configured to determine, for a first waveform, a count of dips that occur between a pair of predetermined zero crossings of a second waveform. The second waveform can be obtained from an electrical circuit.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
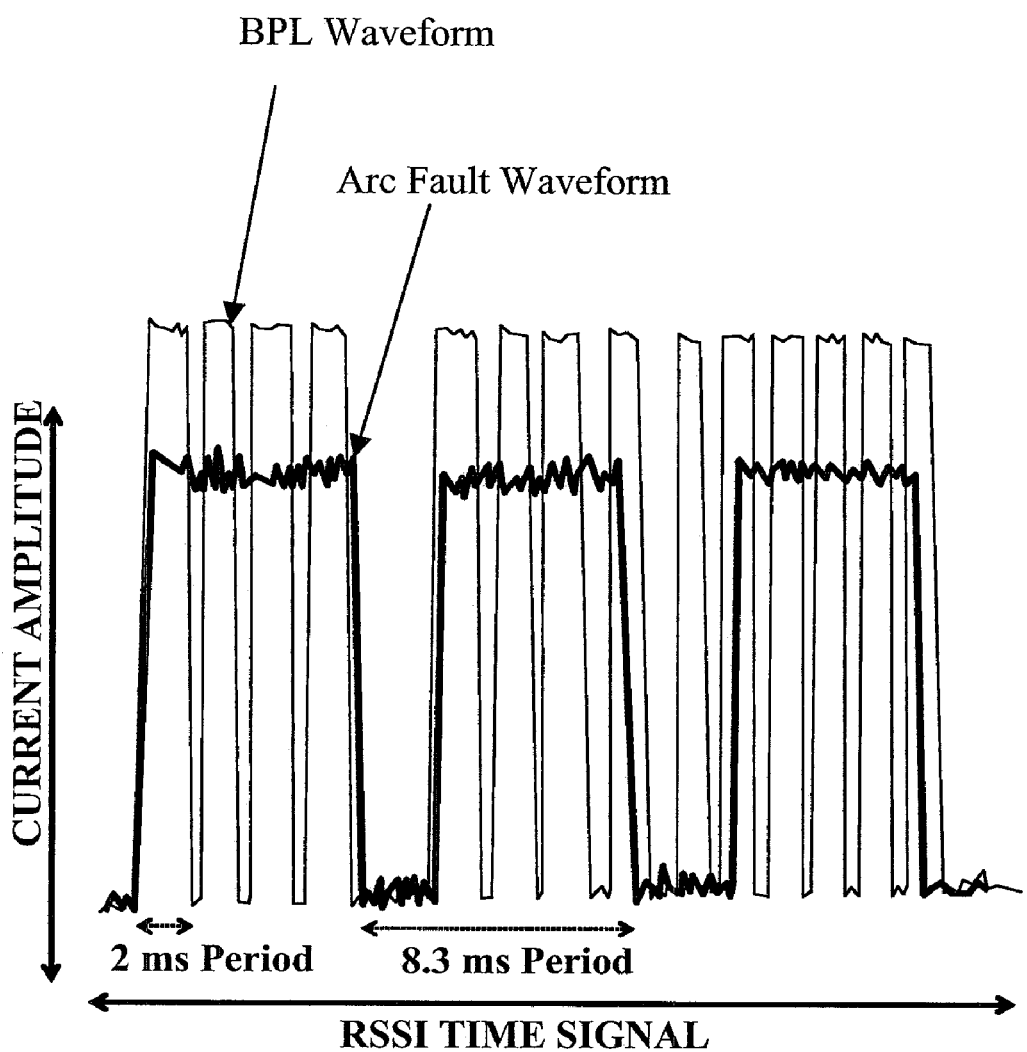
FIG. 1 is a plot of signal strength waveforms generated by both an exemplary arc fault condition and by an exemplary BLP condition, and showing that BPL signal waveforms can mimic arc fault generated waveforms due to the signal strength and periodicity similarities.

When the following terms are used substantively herein, the accompanying definitions apply:

a—at least one.
activity—an action, act, step, and/or process or portion thereof.
adapted to—made suitable or fit for a specific use or situation.
and/or—either in conjunction with or in alternative to.
apparatus—an appliance or device for a particular purpose.
approximately—nearly the same as.
arc fault—a discharge of electricity between two or more conductors, the discharge associated with at least a predetermined voltage, current, and/or power level.
automatically—acting or operating in a manner essentially independent of external influence or control. For example, an automatic light switch can turn on upon "seeing" a person in its view, without the person manually operating the light switch.
below—less than in magnitude.
between—in a separating interval.
Butterworth filter—an electronic filter configured to process an electronic signal, the electronic filter configured to exhibit a flattest possible response in a predetermined passband.
can—is capable of, in at least some embodiments.
change—to correct to a more desired value.
characterize—to define, describe, and/or constrain the qualities of.
circuit—an electrically conducting pathway.
comparator—a device configured to compare a measured property of one object to another.
compare/integrate circuit—one or more electrically coupled components configured to process one or more input signals to determine whether to send a signal requesting a trip of an electrical device.
comprising—including but not limited to.
configured to—capable of performing a particular function.
count—(n.) a number reached by counting;
count—(v.) to increment, typically by one and beginning at zero.
count analysis sub-system—one or more electrically coupled components configured to determine whether to request a trip of an electrical device.
counter—a device and/or system configured to count.
data—distinct pieces of information, usually formatted in a special or predetermined way and/or organized to express concepts.
define—to establish the outline, form, or structure of.
derive—to obtain from a source.
detect—to sense, perceive, and/or identify.
determine—to ascertain, obtain, and/or calculate.
device—a machine, manufacture, and/or collection thereof.
dip—a drop of an amplitude of a waveform below a predetermined amplitude threshold.
direct current restore circuit—one or more electrically coupled components configured to remove a direct current offset from a waveform.
dynamic range—an amplitude range of a waveform.
dynamic range reference calculator—one or more electrically coupled components configured to determine an amplitude range of a waveform.
electrical—pertaining to electricity.
energy—usable power.
even zero crossing—a zero crossing at which the slope of the signal is negative.
even zero crossing mask—a binary signal that goes to zero when a waveform is within a predetermined range of an even zero crossing, and returns to one when the waveform amplitude is outside the predetermined range.
filter—one or more electrically coupled components configured to remove a portion of an electrical signal.
frequency—a number of times of an occurrence in a predetermined time period.
from—used to indicate a source.
general reset circuit—one or more electrically coupled components configured to determine that a waveform does not indicate an arc fault based upon one or more criteria.
greater—larger in magnitude.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
ignore—to disregard.
increment—to change a value by a predetermined amount.
indicate—to signify.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

interruption counter—one or more electrically coupled components configured to increment and/or reset a dip counter.

kilohertz—a count of thousands of cycles per second.

low pass—configured to allow sub-signals of a signal characterized by a frequency below a predetermined maximum threshold to not be filtered, but to filter sub-signals characterized by frequencies above the predetermined maximum threshold from the signal.

machine instructions—directions adapted to cause a machine, such as an information device, to perform a particular operation or function.

machine readable medium—a physical structure from which a machine can obtain data and/or information. Examples include a memory, punch cards, etc.

magnitude—a size or extent.

manage—to direct or control.

mask generation sub-system—one or more electrically coupled components that comprise a zero crossing mask generator.

may—is allowed and/or permitted to, in at least some embodiments.

measurement—a dimension, quantification, and/or capacity, etc. determined by observation.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mix—to combine to produce a composite signal.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

otain—to receive, calculate, determine, and/or compute.

occur—to take place.

odd zero crossing—a zero crossing at which the slope of the signal is positive.

odd zero crossing mask—a binary signal that goes to zero when a waveform is within a predetermined range of an odd zero crossing, and returns to one when the waveform amplitude is outside the predetermined range.

packet—a discrete instance of communication.

peak detector—one or more electrically coupled components configured to provide a signal indicative of an amplitude of one or more waveform peaks.

plurality—the state of being plural and/or more than one.

predetermined—established in advance.

prevent—to keep an event from happening.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

produce—to manufacture or make.

provide—to furnish and/or supply.

reference—an indicator that provides a value and/or orientation relative to something else.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—(n.) a message asking for something.

request—(v.) to ask for something.

reset—cause a counter to be set at a predetermined level, such as zero.

sequential pair of predetermined zero crossings—two zero crossings of a predetermined type not separated by a third zero crossing of a predetermined type. The predetermined zero crossing type can be an even zero crossing, an odd zero crossing, or any zero crossing.

set—a related plurality.

signal—detectable transmitted energy, such as an impulse or a fluctuating electric quantity, such as voltage, current, or electric field strength.

slope—a rate of change.

slope reference calculator—one or more electrically coupled components configured to provide a signal indicative of a slope associated with a waveform zero crossing.

store—to place, hold, and/or retain data, typically in a memory.

substantially—to a great extent or degree.

sub-system—a portion of a system.

system—a collection of mechanisms, devices, data, and/or instructions, the collection designed to perform one or more specific functions.

threshold—a point that when exceeded produces a given effect or result.

trip—(n.) an opening of an electrical circuit that interrupts current flow in the electrical circuit.

trip—(v.) to open an electrical circuit; to automatically interrupt current flow in an electrical circuit.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

waveform—a profile, graph, and/or visual model of variations of a signal's voltage and/or current over time.

zero crossing—a location on a waveform characterized by an amplitude of approximately zero.

zero crossing analysis sub-system—a portion of a system configured to locate and/or count zero crossings.

zero crossing mask generator—one or more electrically coupled components configured to provide an odd zero crossing mask and/or an even zero crossing mask.

DETAILED DESCRIPTION

Certain exemplary embodiments can provide an arc fault detection circuit. The arc fault detection circuit can comprise a zero crossing analysis sub-system comprising a counter configured to determine, for a first waveform, a count of dips that occur between a pair of predetermined zero crossings of a second waveform. The second waveform can be obtained from an electrical circuit Low amperage arcing in Alternating Current (AC) power systems can be distinguished from non-arcing conditions through the measurement of broadband Radio Frequency (RF) energy content generated by the fault. One or more technologies called "broadband-over-power line" (BPL) can employ the power lines as a communication medium for high-speed data transfer. BPL can be capable of adapting to variable conditions present in a power line network to maximize data throughput. This adaptability can be reflected in the RF pattern generated by a BPL network and in general such patterns can look similar to arc fault generated conditions. Thus, BPL can operate in a range of interest that RF arc fault detectors operate and the dynamic nature of BPL can mimic the presence of arc faults. Certain exemplary embodiments can distinguish between an arc fault and a BPL signal and can be implemented in one or more of hardware (such as in the form of an Application Specific Integrated Circuit), firmware, and/or software.

FIG. 1 is a plot of signal strength waveforms generated by both an exemplary arc fault condition and by an exemplary BPL condition, and showing that BPL signal waveforms can mimic arc fault generated waveforms due to the signal strength and periodicity similarities.

Certain exemplary embodiments can:

attempt to discriminate the effects of BPL signals by detecting their presence versus the presence of true arc fault signals;

be used to accurately discriminate between arcing and non-arcing conditions in AC power systems, particularly non-arcing conditions that can be described as Broadband RF signals and/or BPL signals;

attenuate or discriminate those signals considered to be non-arc fault generated;

avoid falsely identifying non-arcing conditions, such as BPL conditions, as arcing conditions and/or arcing conditions as non-arcing conditions; and/or improve discrimination of arcing and non-arcing conditions related to the presence of broadband RF signals present in the power line versus true arcing conditions.

BPL Signal Characteristics

BPL signals can be characterized as being broadband in frequency content and/or dynamic in nature. The conditions of the power line as a transmission line can be relatively variable and/or inefficient for data transmission. For BPL technology to overcome these types of challenges, the designers of BPL have typically resorted to dynamic transmission strategies, such as Orthogonal Frequency Division Multiplexing (OFDM) schemes, to improve data throughput.

BPL transmission strategies in general follow the trend of transmitting data in a pulsed manner, meaning that they typically broadcast data packets and then wait for a period of time before transmitting a next set of packets. A broadcast time can be determined by an amount of data allowed in a transmission frame, which can be determined by a convention and/or a communication protocol.

In some instances, these BPL conditions (broadband RF content and/or transmissions pulsed at approximately 60 Hertz and/or multiples thereof) can mimic arc faults.

Sensor and RF Hardware

In certain exemplary embodiments, the RF signal can be picked up from an AC branch through an RF sensor, which can be an E-core shape ferrite sensor. The signal can be mixed with an oscillating carrier. This operation can assist in making broadband RF signals more relevant. The signal, once mixed with the carrier, can be filtered and amplified. The signal energy level can be measured, quantified, and/or represented with a corresponding signal intensity level. For example, the broadband and/or RF signal can be down-converted to an intermediate frequency (IF) (which can be a precise frequency that can be generated via heterodyne with a local oscillator signal to which other related circuits can be tuned) and a signal can be generated that represents and/or indicates the signal energy (strength) level of the broadband and/or RF signal in at that IF. The newly generated signal can be called a received signal strength indication (RSSI) signal. Typically, this RSSI signal will represent those conditions that are truly broadband in nature, like arc fault conditions and/or other potential sources of broadband information broadcasting in an AC circuit branch. Certain exemplary embodiments can comprise a current sensor and a signal conditioning block (amplifier and conditioning passive components) to provide a signal representative of a branch current.

Mixed-Signal Microprocessor

Certain exemplary embodiments can comprise a mixed-signal microprocessor, which can comprise Analog-to-Digital conversion (A/D) capabilities. The microprocessor can be selected based on an implemented algorithm.

Application Specific Integrated Circuit

In certain exemplary embodiments, integrated hardware blocks can be designed that can mimic an exemplary algorithm in an Application Specific Integrated Circuit (ASIC). The ASIC can incorporate portion of components configured to process sensed electrical signals associated with BPL and/or arc fault detection.

Functional Operation

In certain exemplary embodiments, two inputs can be utilized in order to detect the presence of arc fault signals and/or discriminate between arc faults and signals generated from BPL transmissions.

A first input can be a variable signal that can represent broadband RF signal strength (energy) originated potentially by an arc fault. This can be referred to as a Received Signal Strength Indicator (RSSI) signal provided by the IF receiver described by Blades. A second input can be a signal that can represent a current drawn by a protected branch circuit.

Arc Fault Detection

Certain exemplary embodiments test for wideband RF that is Amplitude Modulated (AM) at approximately twice a line frequency. The wideband part can be taken care of by the sweeping the local oscillator of a super-heterogeneous receiver (Blades), the AM modulation frequency and phase can be handled by a an exemplary method. For embodiments related to a line frequency of approximately 60 Hertz, the method can comprise rejecting wide band RF signals not modulated by approximately 120 Hertz synchronous to a line frequency and phase locked to a current in a circuit breaker. The method can comprise tracking a slope of the RSSI signal for loads that generate a frequency such as approximately 60 Hertz modulated RF noise. Certain exemplary embodiments consider that arc faults have abrupt interruptions near a zero crossing of an AC current cycle. Thus, certain exemplary embodiments can search for conditions, for a line signal having a frequency of approximately 60 Hertz, and characterized by relatively fast transitions.

The method can comprise processing two inputs, a load current and the RSSI, and then combining them to produce an output. Both inputs can be passed through low pass filters. The circuit/process can be broken into two identical halves; each takes half the zero crossings (ZC) at a frequency of approximately 60 Hertz (in embodiments characterized by a line frequency of approximately 60 Hertz). A first half can be configured to handle odd zero crossings. A second half can be configured to handle even zero crossings.

In certain exemplary embodiments, some transients generate currents that don't comprise a zero crossing for several cycles or in less extreme cases comprise uneven duty cycles. In such embodiments, a spacing between odd zero crossings and even zero crossings might not be the same as between even zero crossings and odd zero crossings, but odd to odd spacings and even to even spacings can remain approximately the same.

In the description of the following ten paragraphs, variables are named V1, V2 etc. The fixed parameters that control how the circuit behaves are named P1, P2 etc.

A mask pulse straddling a respective current zero crossing can be generated for each of the odd half and the even half of the zero crossings. The mask can be within approximately 35 degrees (P1) on either side of ZC. Generating the mask pulse can be adaptive to the peak of the current waveform so that a width is similar for sinusoidal currents.

On a leading edge of the mask pulse, an internal value (V1) can be made equal to the RSSI input and while the mask is at a logically high level. V1 can be configured to track a most negative value of the RSSI input. When the pulse mask returns to a logically low level on a trailing edge of the mask, V1 can be held at an approximately constant value.

V1 can be subtracted from the RSSI input to produces a signal, V2 that has a most negative excursion inside the mask at zero. This operation can be referred to as a "Direct current removal" operation.

V2 can be integrated with respect to time (P2) to produce V3. In certain exemplary embodiments, V3 can be characterized by a range of approximately 0 to approximately 2 Volts. A gain of an integrator that integrates V2 can be configured to produce a 10 units/sec output for a unit input.

V2 can be compared to a value P3, a ratio of the peak to peak RSSI signal, by a logical comparator. If V2 is less than P3, a counter can be incremented. If the counter reaches three (P4) between successive mask pulses, the integrator can be reset and V3 can be set at a "zero" value. The counter can be reset to zero by the mask pulse.

The output from the comparator incrementing the counter can be gated with an OR of the two ZC masks, since the signal amplitude will typically drop around the ZC. For line signals characterized by a frequency of approximately 60 Hertz, BPL signals can comprise 3 to 4 holes in the RSSI signal between successive pulse masks in a period of 60 Hertz. Typically an arc RSSI will have 0 to 2 holes in a similar time period. Thus, the counter can tend to reset for BPL signals before it reaches a trip threshold (P5).

V3 increments can be variable by two factors. The first factor can be proportional to the amplitude of a load current (V4). The first factor can be utilized to trip a circuit breaker faster when arc faults are generated with higher currents. The second factor can be related to the Slope of the RSSI signal (V5). The second factor can be configured to exclude signals that are AC modulated that might not be characterized by abrupt interruptions.

The two integrator outputs V3 can be added and the result compared to a value (P5) related to the peak to peak RSSI signal.

Two parameters, P3 and P5 that can be related to the RSSI signal can be generated. The positive peaks of the RSSI can be tracked by a peak detector with a leak. The negative peaks can be tracked by a peak detector. The two signals can be subtracted to provide a voltage, which can be proportional to the peak to peak or dynamic range, referred to zero. The voltage can be multiplied by two constants to produce P5, and P3.

The ZC masks can be generated by slicing the current waveform with a voltage proportional to the peak value of the current utilizing a simple positive peak detector. The peak current can be multiplied by a constant, positive or negative P7, to produce symmetrical slicing levels above and below zero. The outputs can be logically combined to produce the two sets of masks.

Figure 2:
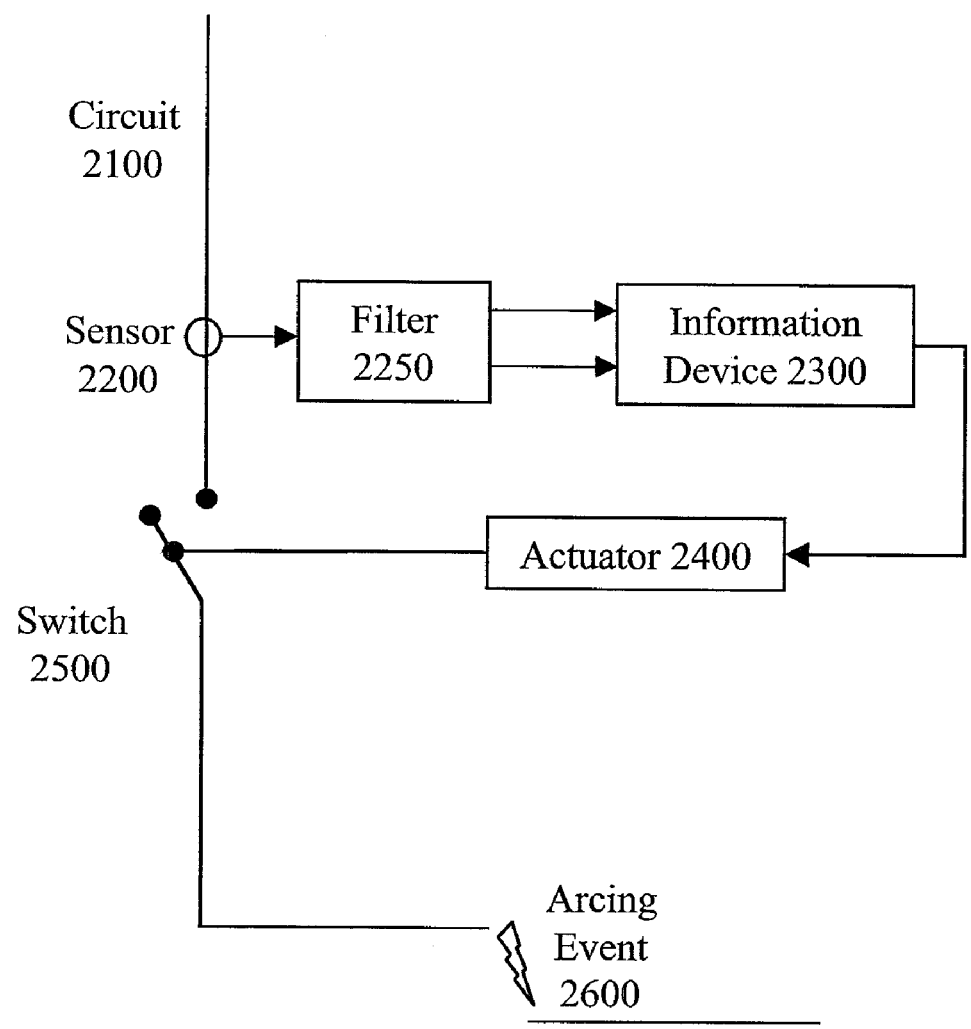
FIG. 2 is a block diagram of an exemplary embodiment of a system 2000.

FIG. 2 is a block diagram of an exemplary embodiment of a system 2000, which can comprise a circuit 2100, an alternating current through which can be sensed and/or detected by sensor 2200. A signal from sensor 2200 can be provided to filter 2250. Filter 2250 can be configured to derive an RSSI waveform and a load current waveform from the signal from sensor 2200. Filter 2250 can be configured to provide signals characterized by the RSSI waveform and/or the load current waveform to information device 2300 for processing. Prior to and/or at information device 2300, the signal can be processed and/or sampled. At information device 2300, the resulting data can be analyzed to identify, for example, to determine if a number of zero crossings of a waveform during a predetermined time period is above a first predetermined threshold, yet below as second predetermined threshold. Based on a signal generated by information device 2300, such as in response to a determination and/or detection of an arcing event 2600 and/or an arcing condition, and/or detection of a hazardous arcing condition, an actuator 2400 can cause a switch 2500 to interrupt circuit 2100. Switch 2500 can be a circuit breaker, such as an AFCI.

Figure 3:
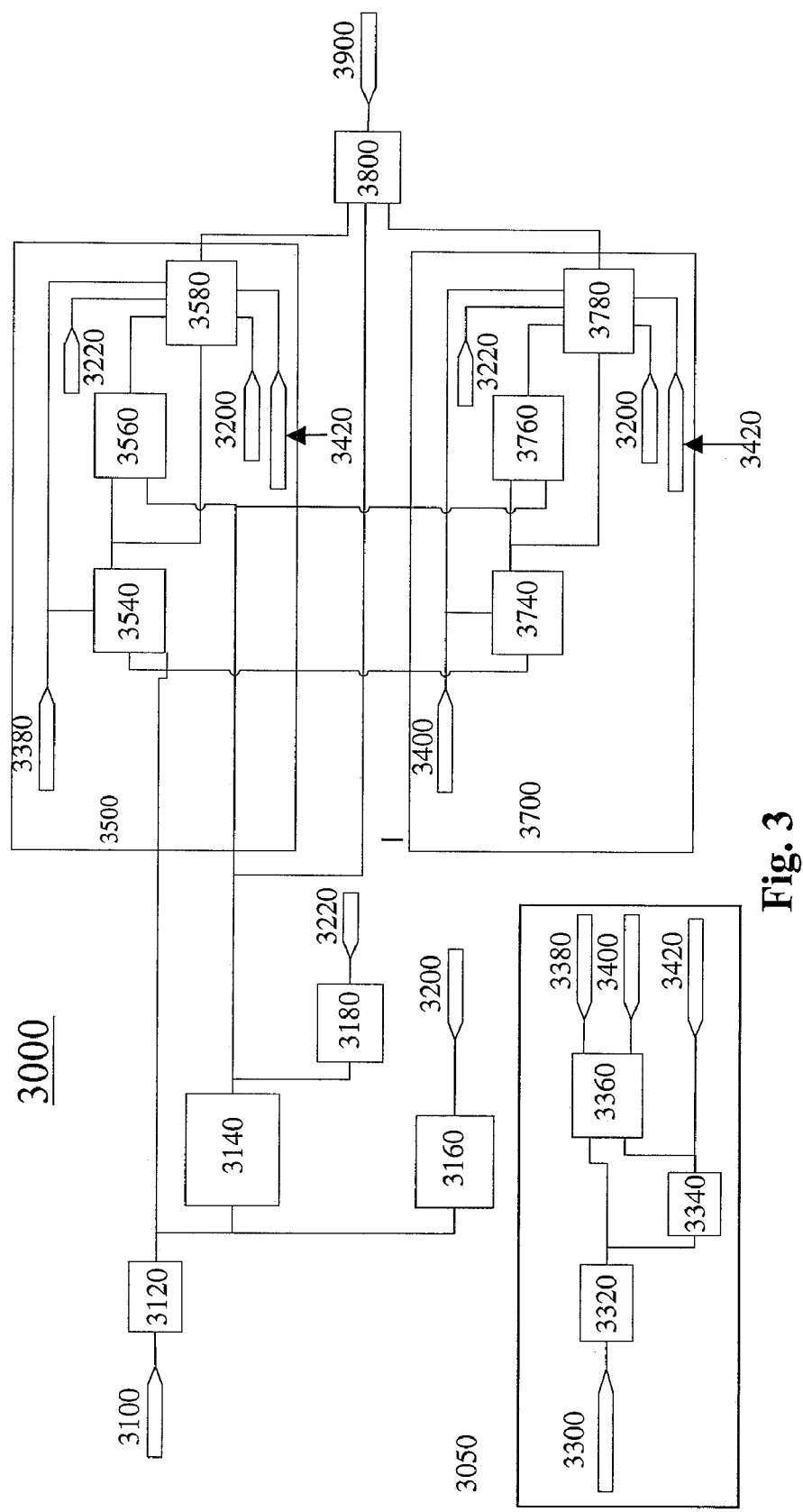
FIG. 3 is a block diagram of an exemplary embodiment of a system 3000.

FIG. 3 is a block diagram of an exemplary embodiment of a system 3000, which can be configured to trip a circuit breaker responsive to a detected arc fault and distinguish the detected arc fault from a BPL signal. System 3000 can comprise a low pass filter 3120, which can be configured to receive a RSSI signal 3100. Low pass filter 3120 can be configured to remove parts of RSSI signal 3100 characterized by frequencies greater than a predetermined frequency.

System 3000 can comprise a mask generation sub-system 3050. Mask generation sub-system 3050 can comprise a low pass filter 3320, which can be configured to receive a load current signal 3300. Low pass filter 3320 can be configured to remove parts of load current signal 3300 characterized by frequencies greater than a predetermined frequency. In certain exemplary embodiments, low pass filter 3120 and/or load pass filter 3320 can be second order Butterworth filters that comprise a three dB corner at two kilohertz.

System 3000 can comprise a peak detector 3340, which can be configured to receive filtered load current signal 3300 and output a current reference signal 3420 characterized by a waveform approximately equal in amplitude to positive and negative peaks of filtered load current signal 3300. In between peaks of filtered load current signal 3300 the amplitude of the waveform of the output of peak detector 3340 can decrease. Peak detector 3340 can be configured to provide a peak signal to an odd compare/integrate circuit 3580, and/or an even compare/integrate circuit 3780. One or more of odd compare/integrate circuit 3580, and/or an even compare/integrate circuit 3780 can be configured to change a predetermined threshold associated with tripping an electrical device. The predetermined threshold associated with a count analysis sub-system.

Filtered load current signal 3300 and/or current reference signal 3420 can be provided to a zero-crossing mask generator 3360, which can be configured to the two signals to generate an odd mask signal 3380 and an even mask signal 3400 that can be fed to an odd Direct current removal circuit 3540, even Direct current removal circuit 3740, odd compare/integrate circuit 3580, and/or even compare/integrate circuit 3780. Zero-crossing mask generator 3360 can be configured to utilized current reference signal 3420 as a reference to establish when an alternating current (AC) signal is entering or leaving a zero crossing region. Boundaries for such a region can be set relative to current reference signal 3420. A first boundary can be slightly above a zero current line and a second boundary can be slightly below the zero current line. When the AC current is above the first boundary and crosses the zero crossing region through the second boundary to a region below, a related portion of the AC waveform can be characterized as a "falling edge". A signal output of the mask generator can be "low" inside the zero crossing every time it crosses the boundary in a "falling edge" fashion, and the output can be a logical "high" when the waveform is outside of the zero crossing region. Such an output can be characteristic of odd mask signal 3380. Even mask signal 3400 can be similarly generated, but the logical low can be determined when a "rising edge" condition is met, which is similar to the falling edge but entering the zero crossing region from below the lower bound through the upper bound. Since this signal can be related to an actual current amplitude, the estimation of the zero crossing region can be proportional for all currents.

Odd mask signal 3380 can be a pulsed signal that is logically low in a predetermined time interval surrounding an odd zero crossing. Odd mask signal 3380 can be logically high in between odd zero crossing events. Even mask signal 3400 can be a pulsed signal that is logically low in a predetermined time interval surrounding an even zero crossing. Even mask signal 3400 can be logically high in between even zero crossing events.

The filtered RSSI signal 3100 can be provided to a dynamic range reference calculator 3140, which can be configured to generate a reference signal indicative of a dynamic range of filtered RSSI signal 3100. The reference signal can be used by a general reset block 3180, an odd interruption counter block 3560, and/or an even interruption counter block 3760. The output of dynamic range reference calculator 3140 can be representative of a dynamic range of RSSI signal 3100. The output of dynamic range reference calculator 3140 can ramp from a level below a general reset threshold to a level above a general reset threshold responsive to an input signal indicative of an arc fault.

Filtered RSSI signal 3100 can be provided to a slope reference calculator 3160, which can be configured to determine a slope of filtered RSSI signal 3100 and provide an RSSI slope 3200. RSSI slope 3200 can be used modify an integration constant of odd integrate/compare block 3580 and/or even integrate/compare block 3780. System 3000 and/or slope reference calculator 3160 can be configured to ignore low-slope zero crossings comprised by filtered RSSI signal 3100 that is characterized by a waveform slope below a predetermined slope threshold.

In event of an arc fault, RSSI slope 3200 can be relatively large due to a type of abrupt interruption of a generated RF. Certain electrical loads, while in operation, can be capable of emitting RF signals. Such RF signals can be distinguished from arc fault signals by a lack of relatively large values for RSSI slope 3200.

General reset block 3180 can be configured to be responsible for limiting a sensitivity of system 3000 to noise. General reset block 3180 can receive and/or determine a dynamic range of RSSI signal 3100 and compare that dynamic range to a predetermined dynamic range threshold. General reset block 3180 can be configured to generate a reset signal 3220 responsive a determination that the dynamic range is below the predetermined dynamic range threshold. System 3000 can be configured to disregard, ignore, and/or avoid tripping an electrical circuit if RSSI signal 3100 is less than the predetermined dynamic range threshold. In certain exemplary embodiments, the dynamic range of an arc fault condition can decrease as a length of wire between an arc-fault circuit interrupter (AFCI) and a fault increases. Certain exemplary embodiments can utilize a length of up to approximately 150 feet by utilizing a minimum dynamic range of approximately three standard deviations of an RSSI noise floor variation.

Odd Direct current removal circuit 3540 looks at the minimum value of filtered RSSI signal 3100 when odd mask signal 3380 is high. When odd mask signal 3380 is low, odd Direct current removal circuit 3540 can subtract filtered RSSI signal 3100. Even Direct current removal circuit 3740 looks at the minimum value of filtered RSSI signal 3100 when even mask signal 3400 is high. When even mask signal 3400 is low, odd Direct current removal circuit 3540 can subtract filtered RSSI signal 3100. Odd Direct current removal circuit 3540 and even Direct current removal circuit 3740 can each be adapted to modify filtered RSSI signal 3100 such that dips in filtered RSSI signal 3100 have a minimum voltage of approximately zero volts.

Odd interruption counter 3560 and even interruption counter 3760 can look at the respective outputs of odd direct current removal circuit 3540 and even direct current removal circuit 3740 along with a scaled version of the output signal from dynamic range reference calculator 3140. Odd interruption counter 3560 and even interruption counter 3760 can look for dips in filtered RSSI signal 3100 when odd mask signal 3380 and/or even mask signal 3400 are low. Odd interruption counter 3560 and even interruption counter 3760 can be configured to count dips and when the dip count is above a predetermined count threshold can reset the integrated value incremented by the compare/integrate circuit back to zero. In certain exemplary embodiments, the predetermined count threshold can be between two and four. In certain exemplary embodiments, odd interruption counter 3560 can be a first zero crossing analysis sub-system comprising a counter configured to determine, for a waveform associated with filtered RSSI signal 3100, a first count of dips that occur between a first sequential pair of predetermined zero crossings of a waveform associated with load current signal 3300. The waveform associated with filtered RSSI signal 3100 can be associated with and/or derived from the waveform associated with load current signal 3300. In certain exemplary embodiments, the waveform associated with load current signal 3300 can be obtained from an electrical circuit.

In certain exemplary embodiments, even interruption counter 3760 can be a second zero crossing analysis sub-system comprising a counter configured to determine, for a waveform associated with filtered RSSI signal 3100, a first count of dips that occur between a first sequential pair of predetermined zero crossings of a waveform associated with load current signal 3300.

Odd interruption counter 3560 and/or even interruption counter 3760 can be configured to increment an interruption count responsive to a received signal indicative of a zero crossing of load current signal 3300 and a received signal indicative of a measurement of a magnitude associated with filtered RSSI signal 3100 exceeding a predetermined magnitude threshold.

Odd compare/integrate circuit 3580, and/or even compare/integrate circuit 3780 can be configured to increment an output signal based upon signals obtained from odd interruption counter 3560 and/or even interruption counter 3760 when a count of dips exceed a first predetermined dip threshold, but are less than a second predetermined dip threshold. An increment associated with odd compare/integrate circuit 3580, and/or even compare/integrate circuit 3780 can be attenuated by a level of current reference signal 3420 and/or by RSSI slope 3200. Odd compare/integrate circuit 3580, and/or even compare/integrate circuit 3780 can be configured to disregard and/or not provide a tripping signal if either:

odd mask signal 3380 and even mask signal 3400 are low;
or
when reset signal 3220 is low.

In certain exemplary embodiments, odd compare/integrate circuit 3580, and/or even compare/integrate circuit 3780 can be considered to be a count analysis sub-system comprising a comparator configured to request a trip of an electrical device responsive to a determination that a count of dips is greater than a first count threshold, but below a second count threshold Trip condition block 3800 can be configured add both outputs from an odd zero crossing analysis sub-system 3500 and an even zero crossing analysis sub-system 3700 and compares them to an output signal from dynamic range reference calculator 3140. System 3000 can be configured to differentiate between BPL signals and those generated by arc faults. In addition, system 3000 can be configured, for an arc fault with lower dynamic range (further away from the AFCI), to trip a circuit breaker responsive to a lower integrate trip value.

Figure 4:
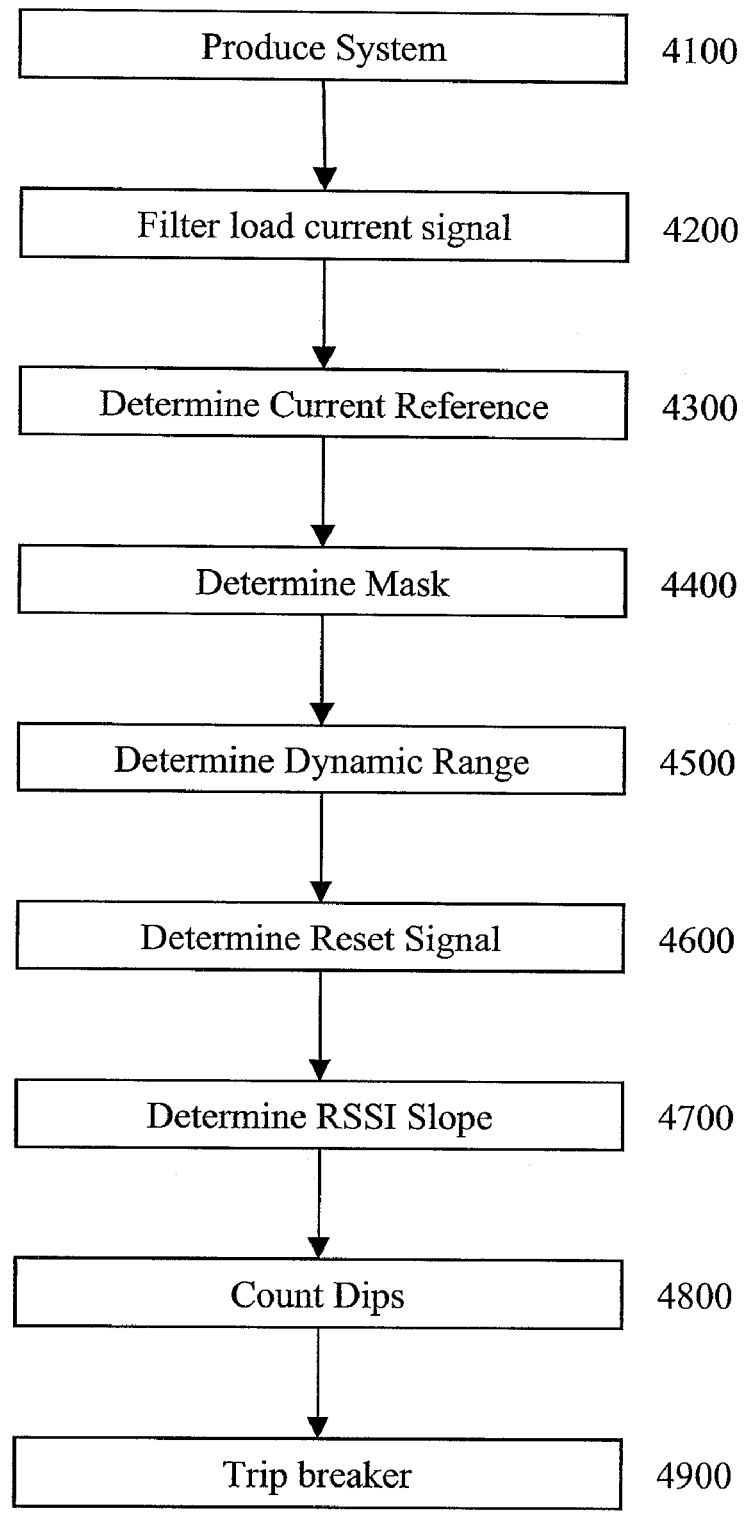
FIG. 4 is a flow chart of an exemplary Arc Fault Detection method 4000.

FIG. 4 is a flowchart of an exemplary embodiment of a method 4000. At activity 4100, an arc fault detection circuit can be produced. The arc fault detection circuit can comprise a zero crossing analysis sub-system comprising a counter. The zero crossing analysis sub-system can be configured to determine, for a first waveform, a first count of dips that occur between a first sequential pair of predetermined zero crossings of a second waveform. The first waveform and the second waveform can be derived from, associated with, and or related to a single detected signal, which can be obtained from an electrical circuit. The arc fault detection circuit can comprise a count analysis sub-system comprising a comparator. The count analysis sub-system can be configured to request a trip of said electrical device responsive to a determination that the first count of dips is greater than a first count threshold, but below a second count threshold.

At activity 4200, a load current signal and/or an RSSI signal can be filtered via a low pass filter. The low pass filter can be configured to remove signal components characterized by a frequency above a predetermined threshold frequency. The predetermined threshold frequency can be, in kilohertz, 0.11, 0.8, 1, 1.76, 2, 2.9, 3, 3.1, 3.6, 4, 5, etc., and/or any value or subrange therebetween.

At activity 4300, a current reference can be determined. The current reference can be determined via a peak detector. The current reference can be configured to provide an indication regarding whether a particular signal waveform is in a zero crossing region. In certain exemplary embodiments, the current reference can be configured to provide information regarding whether the particular signal waveform is rising or falling.

At activity 4400, an odd and/or even zero crossing mask can be determined. Each determined zero crossing mask can comprise a signal that is logically high when a load current waveform is not within a predetermined range of a predetermined zero crossing. Each determined zero crossing mask can be logically low when the load current waveform is within a predetermined range of a predetermined zero crossing. In certain exemplary embodiments, the odd zero crossing mask can be logically low for zero crossings characterized by a rising edge of the load current waveform. In certain exemplary embodiments, the even zero crossing mask can be logically low for zero crossings characterized by a falling edge of the load current waveform.

At activity 4500, a dynamic range can be determined. The dynamic range can be indicative of a waveform amplitude of an RSSI signal.

At activity 4600, a reset signal can be determined. The reset signal can be generated if the waveform amplitude is below a predetermined threshold. If the waveform amplitude is below the predetermined threshold, an arc fault detection system can be configured to determine that no trip signal should be sent to a circuit breaker. The reset signal can be configured to reset a counter and/or an integrator comprised in the arc fault detection system.

At activity 4700, an RSSI slope can be determined. The RSSI slope can be used to determine the presence of an arc fault. Relatively high values for the RSSI slope can be indicative of a detected arc fault. Relatively low values for the RSSI signal can be indicative of a non-arc fault condition.

At activity 4800, dips in a waveform can be counted. The count of dips determined, for a first waveform, can be between a sequential pair of predetermined zero crossings of a second waveform. In certain exemplary embodiments, the first waveform and the second waveform can be derived from a single detected signal. The single detected signal can be obtained from an electrical circuit.

At activity 4900, a circuit breaker can be tripped and/or a request can be made for the circuit breaker to be tripped responsive to a determination that a count of dips in the first waveform is greater than a first count threshold, but below a second count threshold.

Figure 5:
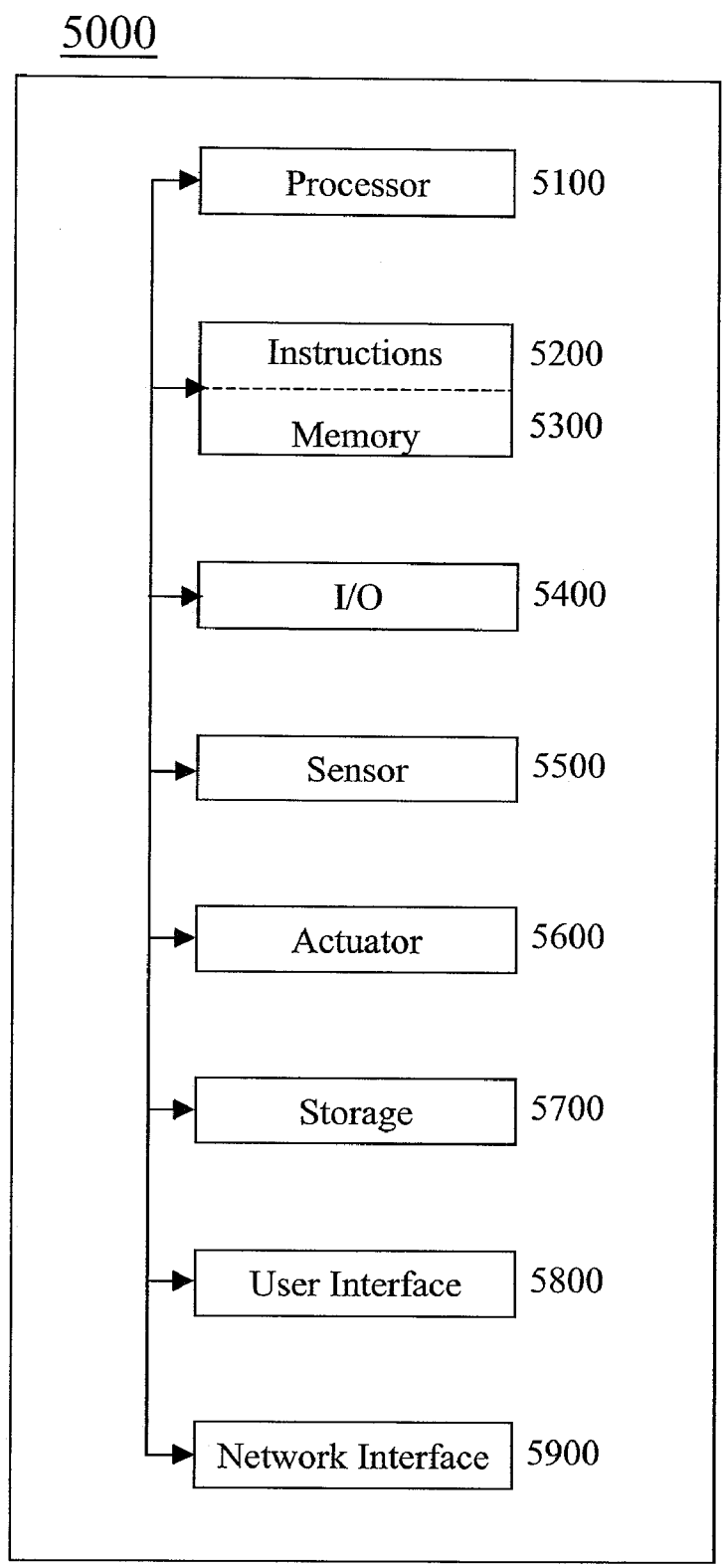
FIG. 5 is a block diagram of an exemplary embodiment of an information device 5000.

FIG. 5 is a block diagram of an exemplary embodiment of an information device 5000, which in certain operative embodiments can comprise, for example, information device 2300 of FIG. 2. Information device 5000 can comprise and/or be coupled to any of numerous well-known components, such as for example, one or more processors 5100, one or more instructions 5200 stored in one or more memories 5300, one or more input/output (I/O) devices 5400, one or more sensors 5500, one or more actuators 5600, one or more storage devices 5700, one or more user interfaces 5800, and/or network interfaces 5900, etc.

In certain exemplary embodiments, detection of an arcing condition can result in a notification of that fact being presented via a graphical user interface 5800. Signal information related to amplitude-duration pairs, arcing and/or non-arcing events and/or conditions, and/or responses thereto, etc., can be logged, archived, and/or analyzed to, for example, avoid hazards, determine causes, spot patterns, detect trends, and/or perform predictive and/or preventive maintenance, etc.

Signal information, information related to a detected arc fault, and/or information related to a detected BPL signal can be processed and/or transmitted to a network via network interfaces 5900. One or more information devices (not illustrated) communicatively coupled to the network can be configured to receive, process, render, report, and/or store signal information.

Figure 6A:
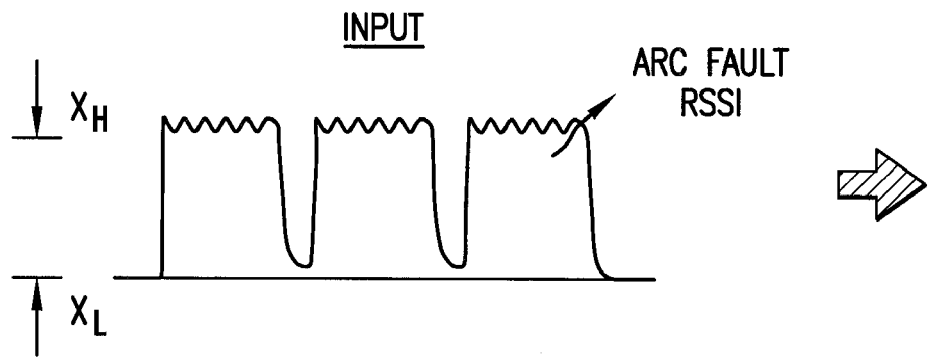
FIG. 6A is an exemplary input waveform to a dynamic range reference calculator.

FIG. 6A is an exemplary input waveform to a dynamic range reference calculator.

Figure 6B:
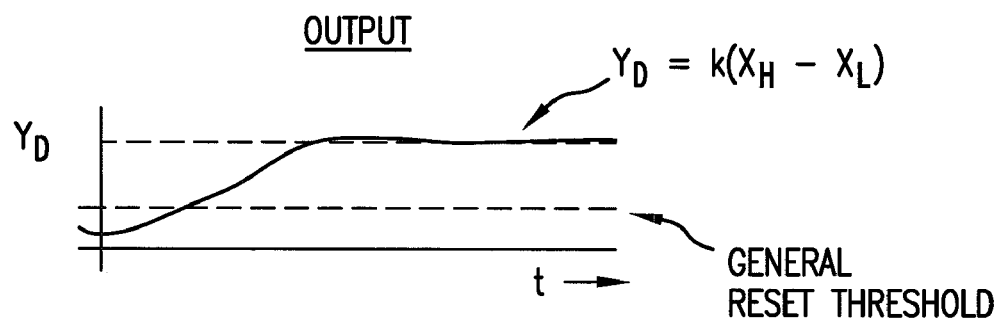
FIG. 6B is an exemplary output waveform from a dynamic range reference calculator.

FIG. 6B is an exemplary output waveform from a dynamic range reference calculator.

Figure 7A:
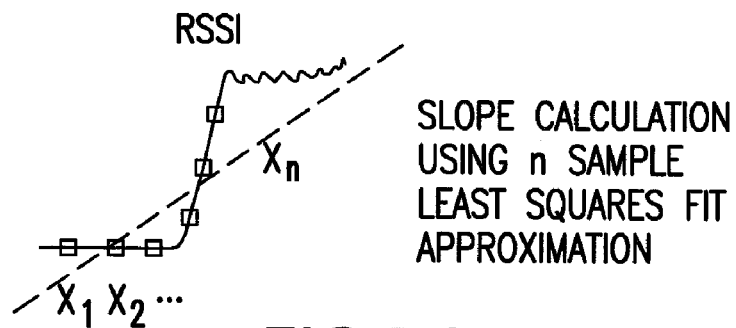
FIG. 7A is an exemplary partial input waveform to a slope reference calculator.

FIG. 7A is an exemplary partial input waveform to a slope reference calculator.

Figure 7B:
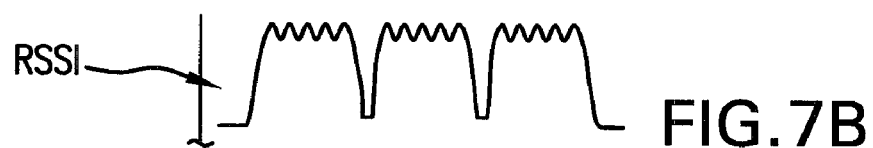
FIG. 7B is an exemplary input waveform to a slope reference calculator.

FIG. 7B is an exemplary input waveform to a slope reference calculator.

Figure 7C:
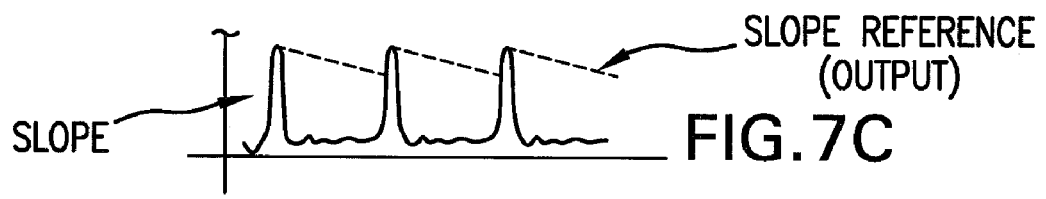
FIG. 7C is an exemplary output waveform from a slope reference calculator.

FIG. 7C is an exemplary output waveform from a slope reference calculator.

Figure 8:
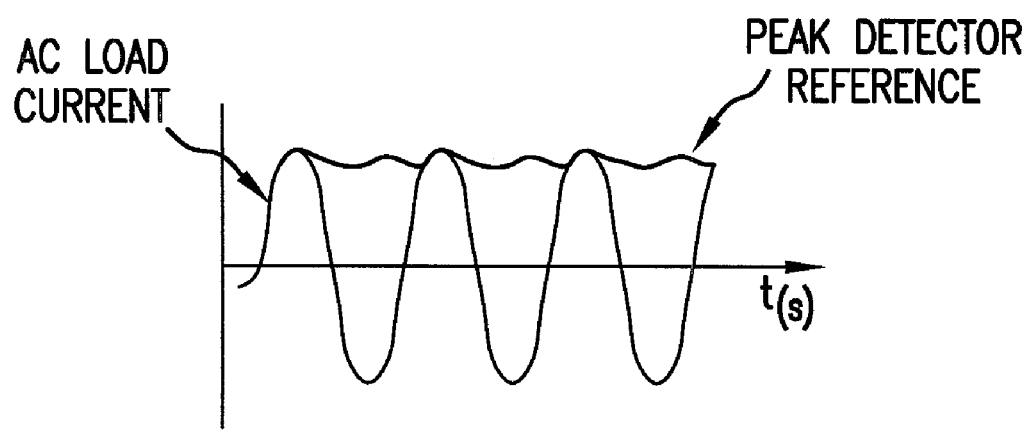
FIG. 8 is an exemplary input and output waveform of a peak detector.

FIG. 8 is an exemplary input and output waveform of a peak detector.

Figure 9A:
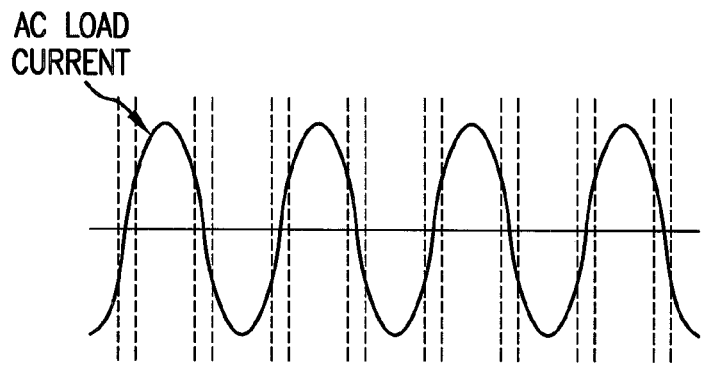
FIG. 9A is an exemplary input waveform to a zero crossing mask generator.

FIG. 9A is an exemplary input waveform to a zero crossing mask generator.

Figure 9B:
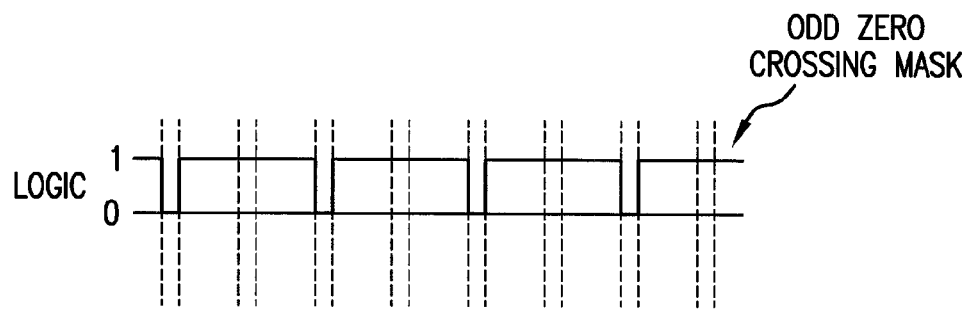
FIG. 9B is an exemplary odd mask waveform from a zero crossing mask generator.

FIG. 9B is an exemplary odd mask waveform from a zero crossing mask generator.

Figure 9C:
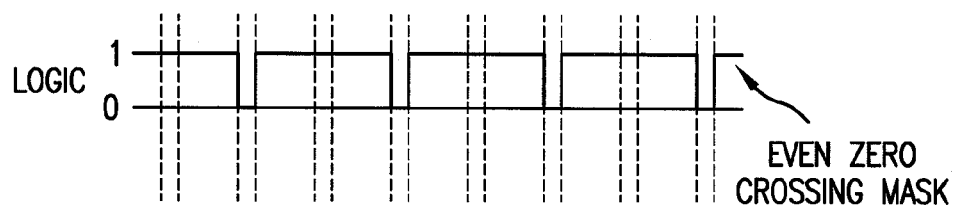
FIG. 9C is an exemplary even mask waveform from a zero crossing mask generator.

FIG. 9C is an exemplary even mask waveform from a zero crossing mask generator.

Figure 9D:
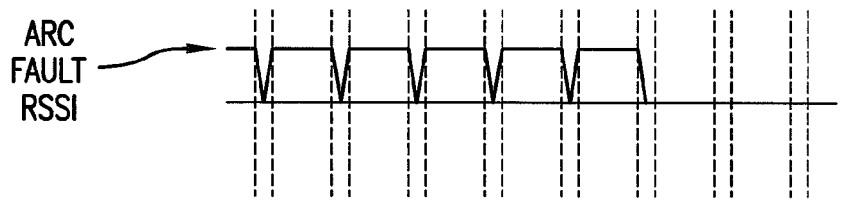
FIG. 9D is an exemplary RSSI waveform indicative of an arc fault.

FIG. 9D is an exemplary RSSI waveform indicative of an arc fault.

Figure 10A:
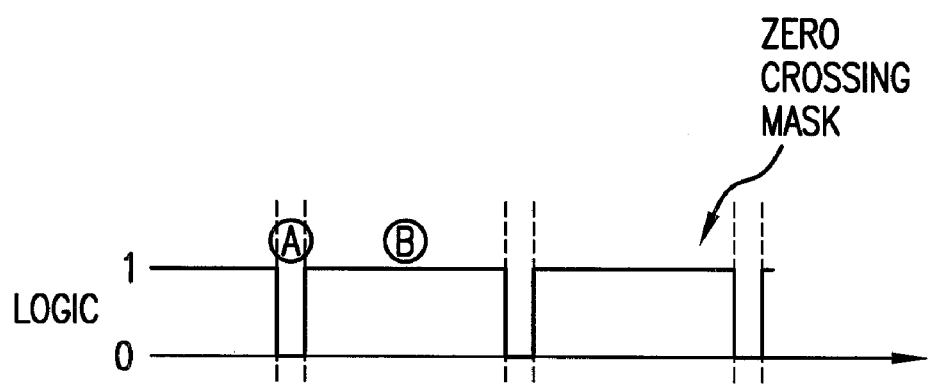
FIG. 10A is an exemplary zero crossing mask input waveform to a direct current removal circuit.

FIG. 10A is an exemplary zero crossing mask input waveform to a direct current removal circuit.

Figure 10B:
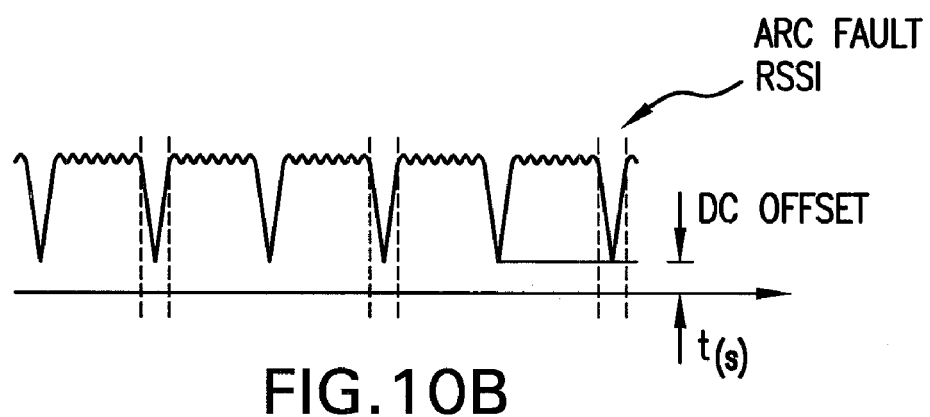
FIG. 10B is an exemplary RSSI input waveform to a direct current removal circuit.

FIG. 10B is an exemplary RSSI input waveform to a direct current removal circuit.

Figure 11A:
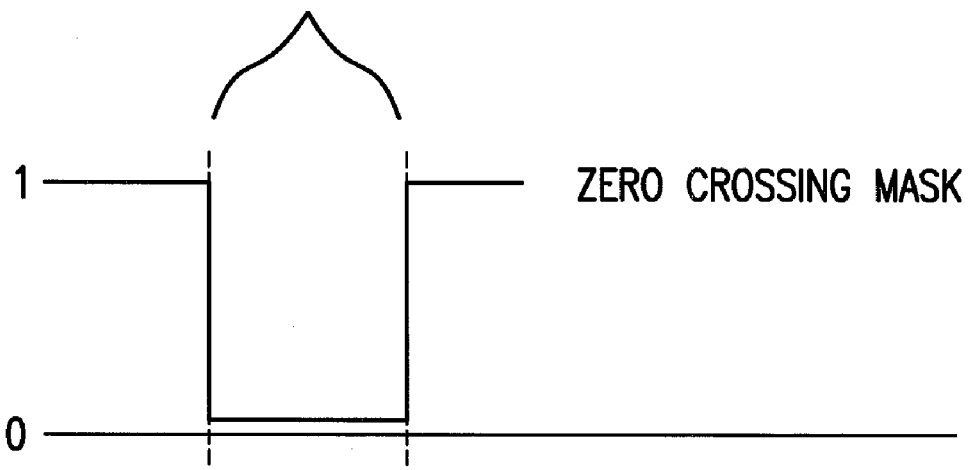
FIG. 11A is an exemplary partial waveform of a zero crossing mask input signal to a direct current removal circuit.

FIG. 11A is an exemplary partial waveform of a zero crossing mask input signal to a direct current removal circuit.

Figure 11B:
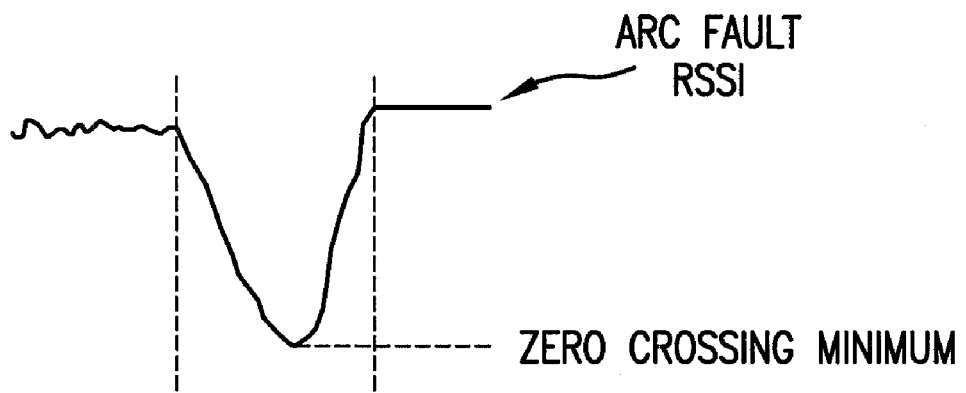
FIG. 11B is an exemplary partial waveform of a RSSI input signal to a direct current removal circuit.

FIG. 11B is an exemplary partial waveform of a RSSI input signal to a direct current removal circuit.

Figure 12:
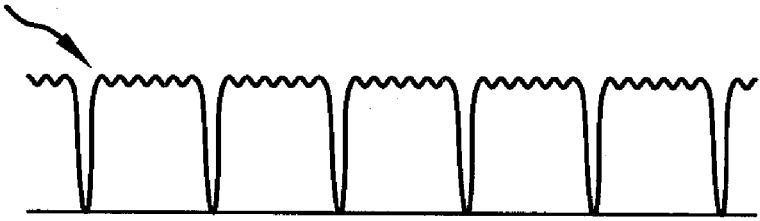
FIG. 12 is an exemplary output waveform from a direct current removal circuit.

FIG. 12 is an exemplary output waveform from a direct current removal circuit.

Figure 13A:
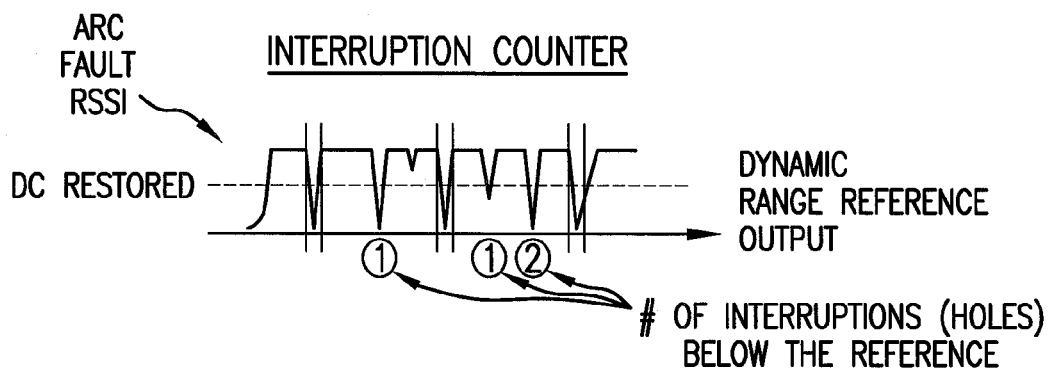
FIG. 13A is an exemplary RSSI input waveform to an interruption counter.

FIG. 13A is an exemplary RSSI input waveform to an interruption counter.

Figure 13B:
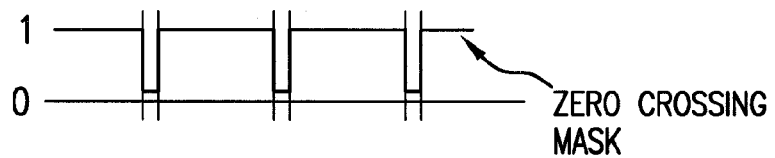
FIG. 13B is an exemplary zero crossing mask input waveform to an interruption counter.

FIG. 13B is an exemplary zero crossing mask input waveform to an interruption counter.

Figure 13C:
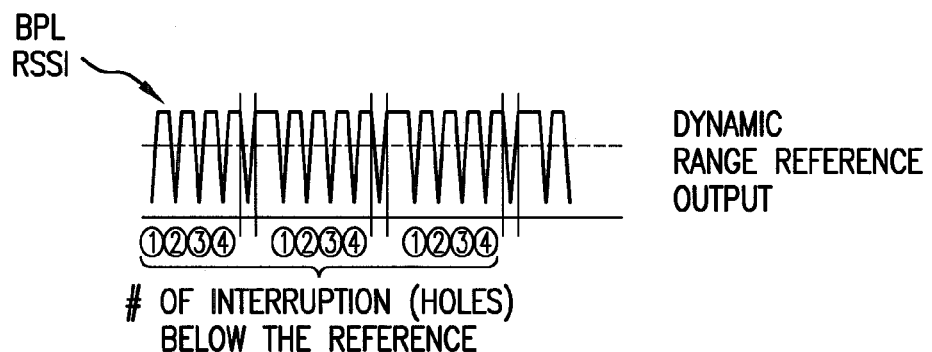
FIG. 13C is an exemplary RSSI input waveform to an interruption counter with a dynamic range reference output waveform superimposed.

FIG. 13C is an exemplary RSSI input waveform to an interruption counter with a dynamic range reference output waveform superimposed.

Figure 13D:
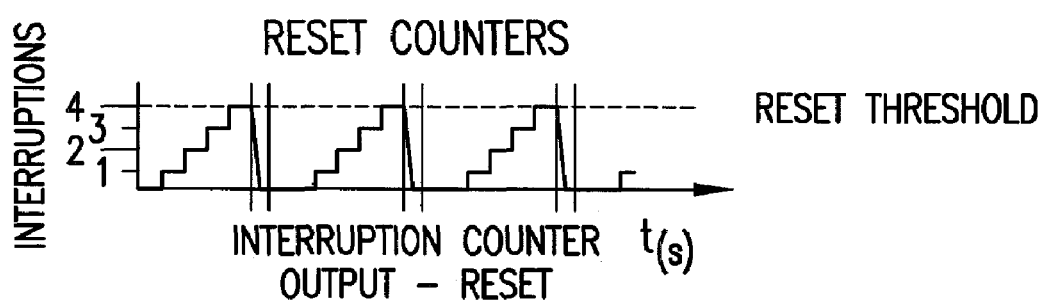
FIG. 13D is an exemplary graph of a count of dips as a function of time for an exemplary interruption counter.

FIG. 13D is an exemplary graph of a count of dips as a function of time for an exemplary interruption counter.

Figure 13E:
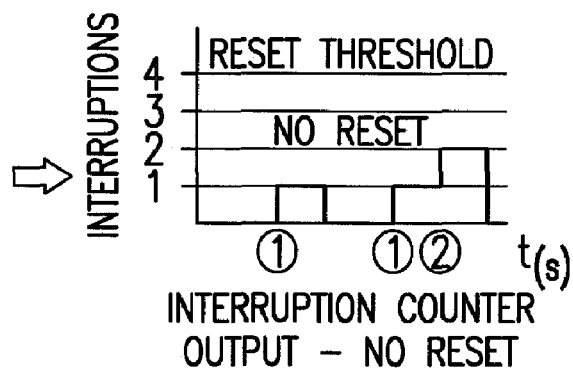
FIG. 13E is an exemplary output from an interruption counter.

FIG. 13E is an exemplary output from an interruption counter.

Figure 14A:
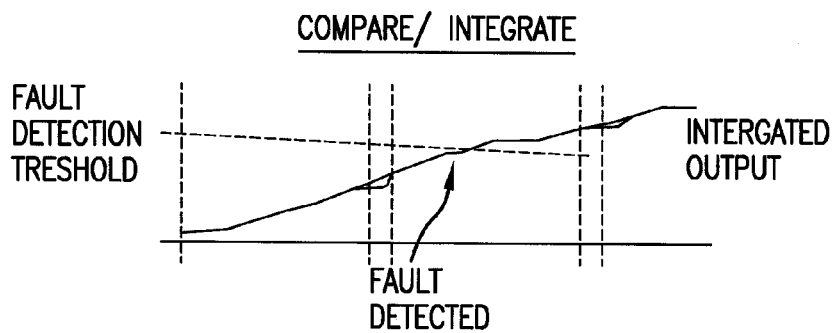
FIG. 14A is an exemplary graph illustrating a determination of an arc fault associated with a compare/integrate circuit.

FIG. 14A is an exemplary graph illustrating a determination of an arc fault associated with a compare/integrate circuit.

Figure 14B:
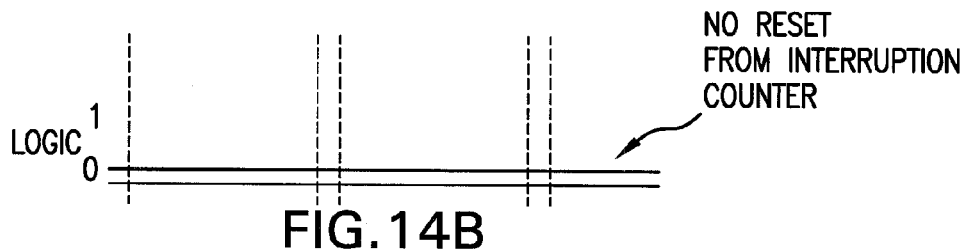
FIG. 14B is an exemplary graph illustrating a determination of an absence of a count indicative of an arc fault associated with a compare/integrate circuit.

FIG. 14B is an exemplary graph illustrating a determination of an absence of a count indicative of an arc fault associated with a compare/integrate circuit.

Figure 14C:
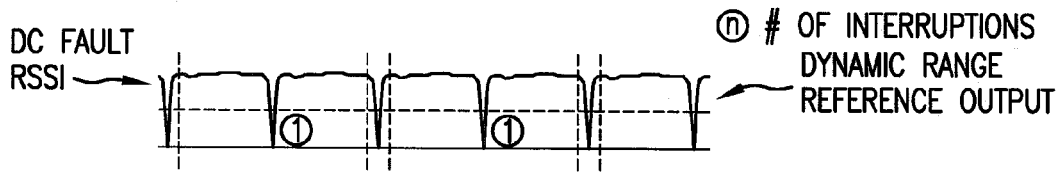
FIG. 14C is an exemplary RSSI waveform indicative of an arc fault with a dynamic range reference output threshold superimposed.

FIG. 14C is an exemplary RSSI waveform indicative of an arc fault with a dynamic range reference output threshold superimposed.

Figure 14D:
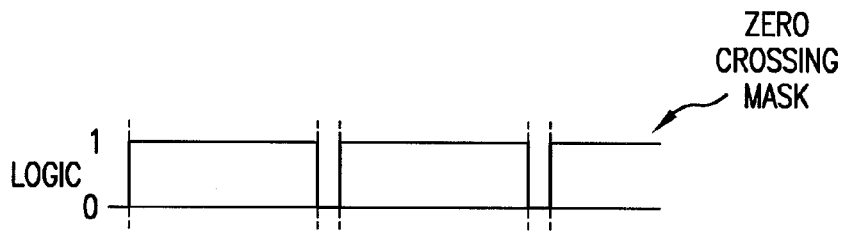
FIG. 14D is an exemplary zero crossing mask input waveform to a compare/integrate circuit.

FIG. 14D is an exemplary zero crossing mask input waveform to a compare/integrate circuit.

Figure 14E:
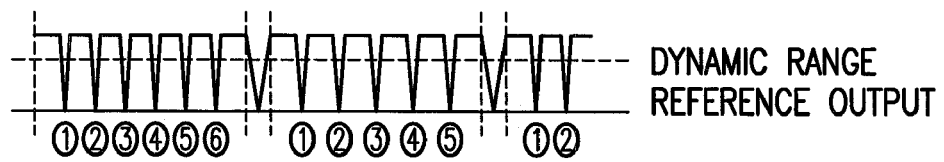
FIG. 14E is an exemplary RSSI waveform indicative of an arc fault with a dynamic range reference output threshold superimposed and indexed dips.

FIG. 14E is an exemplary RSSI waveform indicative of an arc fault with a dynamic range reference output threshold superimposed and indexed dips.

Figure 14F:
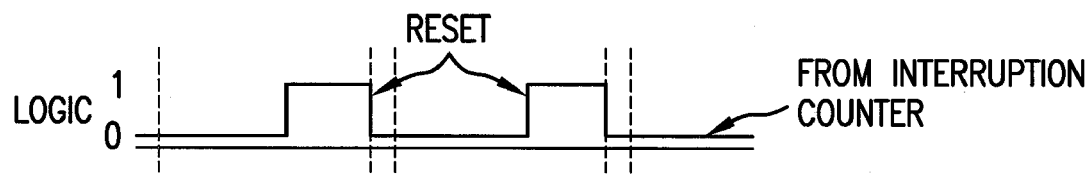
FIG. 14F is an exemplary logic signal associated with a compare/integrate circuit.

FIG. 14F is an exemplary logic signal associated with a compare/integrate circuit.

Figure 14G:
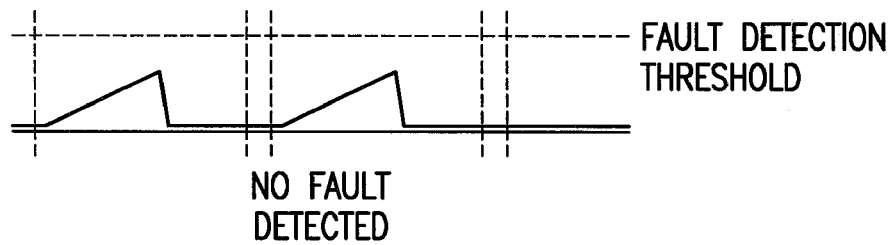
FIG. 14G is an exemplary graph illustrating a determination of an absence of an arc fault due to a counter reset associated with a compare/integrate circuit.

FIG. 14G is an exemplary graph illustrating a determination of an absence of an arc fault due to a counter reset associated with a compare/integrate circuit.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system comprising:
    an arc fault detection circuit comprising:
        a first zero crossing analysis sub-system comprising a counter configured to determine, for a first waveform, a first count of dips that occur between a first sequential pair of predetermined zero crossings of a second waveform; and
        a count analysis sub-system comprising a comparator configured to request a trip of an electrical device responsive to a determination that said first count of dips is greater than a first count threshold, but below a second count threshold.

2. The system of claim 1, further comprising:
a filter configured to derive said second waveform from said first waveform.

3. The system of claim 1, further comprising:
a second zero crossing analysis sub-system configured to determine, for said first waveform, a second count of dips that occur between a second sequential pair of predetermined zero crossings of said second waveform.

4. The system of claim 1, further comprising:
a low pass filter configured to remove high frequency signals from a signal that characterizes said first waveform, said high frequency signals characterized by a frequency greater than approximately two kilohertz.

5. The system of claim 1, further comprising:
a dynamic range reference calculator configured to provide a reference signal indicative of a dynamic range of said first waveform.

6. The system of claim 1, further comprising:
a reset circuit configured to determine that said first waveform does not indicate a fault based upon a determination that that an electrical measurement associated with said first waveform is below a predetermined electrical threshold.

7. The system of claim 1, further comprising:
a slope reference calculator configured to ignore low-slope zero crossings comprised by said first waveform and characterized by a waveform slope below a predetermined slope threshold.

8. The system of claim 1, further comprising:
a mask generation sub-system comprising:
    a low pass filter configured to remove high frequency signals from a signal that characterizes said second waveform, said high frequency signals characterized by a frequency greater than approximately two kilohertz, said first zero crossing analysis sub-system configured to receive signals derived from said second waveform via said low pass filter.

9. The system of claim 1, further comprising:
a mask generation sub-system comprising:
    a peak detector configured to provide a peak signal to a compare/integrate circuit, said compare/integrate circuit adapted to change at least one predetermined threshold associated with tripping said electrical device, said at least one predetermined threshold associated with said count analysis sub-system.

10. The system of claim 1, further comprising:
a mask generation sub-system comprising:
    a zero crossing mask generator configured to generate an odd zero crossing mask and an even zero crossing mask, said first zero crossing analysis sub-system configured to receive at least one of said odd zero crossing mask and said even zero crossing mask.

11. The system of claim 1, said first zero crossing analysis sub-system comprising:
a direct current removal circuit configured to remove a direct current offset from said first waveform.

12. The system of claim 1, said first zero crossing analysis sub-system comprising:
an interruption counter configured to increment an interruption count responsive to a first received signal indicative of a zero crossing of said second waveform and a second received signal indicative of measurement of a magnitude associated with said first waveform exceeding a predetermined magnitude threshold.

13. The system of claim 1, said first zero crossing analysis sub-system comprising:
an interruption counter configured to reset an interruption count responsive to said first count of dips exceeding said second count threshold.

14. The system of claim 1, said first zero crossing analysis sub-system comprising:
a compare/integrate circuit configured to increment a trip count responsive to one or more of a first signal indicative of said first count, a second signal indicative of a slope associated with said first waveform exceeding a predetermined slope threshold, and a third signal indicative of a magnitude of a current reference.

15. The system of claim 1, further comprising:

a second zero crossing analysis sub-system configured to determine, for said first waveform, a second count of dips that occur between a second sequential pair of predetermined zero crossings of said second waveform, said second zero crossing analysis sub-system comprising a direct current removal circuit configured to remove a direct current offset from said first waveform.

16. The system of claim 1, further comprising:

a second zero crossing analysis sub-system configured to determine, for said first waveform, a second count of dips that occur between a second sequential pair of predetermined zero crossings of said second waveform, said second zero crossing analysis sub-system comprising an interruption counter configured to increment an interruption count responsive to a first received signal indicative of a zero crossing of said second waveform and a second received signal indicative of measurement of a magnitude associated with said first waveform exceeding a predetermined magnitude threshold.

17. The system of claim 1, further comprising:

a second zero crossing analysis sub-system configured to determine, for said first waveform, a second count of dips that occur between a second sequential pair of predetermined zero crossings of said second waveform, said second zero crossing analysis sub-system comprising an interruption counter configured to reset an interruption count responsive to said first count of dips exceeding said second count threshold.

18. A method comprising:

producing an arc fault detection circuit comprising:

a first zero crossing analysis sub-system comprising a counter configured to determine, for a first waveform, a first count of dips that occur between a first sequential pair of predetermined zero crossings of a second waveform; and a count analysis sub-system comprising a comparator configured to request a trip of an electrical device responsive to a determination that said first count of dips is greater than a first count threshold, but below a second count threshold.

19. A machine-readable medium comprising machine executable instructions for activities comprising:

requesting a trip of an electrical device associated with an electrical circuit responsive to a determination that a count of dips is greater than a first count threshold, but below a second count threshold, said count of dips determined, for a first waveform, between a sequential pair of predetermined zero crossings of a second waveform.

\* \* \* \* \*